United States Patent
Ichikawa et al.

(10) Patent No.: US 6,984,253 B2
(45) Date of Patent: Jan. 10, 2006

(54) HONEYCOMB FILTER

(75) Inventors: Shuichi Ichikawa, Handa (JP); Naoshi Masukawa, Ama-gun (JP)

(73) Assignee: NGK Insulators, Ltd., Nagoya (JP)

( * ) Notice: Subject to any disclaimer, the term of this patent is extended or adjusted under 35 U.S.C. 154(b) by 203 days.

(21) Appl. No.: 10/250,504

(22) PCT Filed: Oct. 7, 2002

(86) PCT No.: PCT/JP02/10399

§ 371 (c)(1),
(2), (4) Date: Jul. 3, 2003

(87) PCT Pub. No.: WO03/033104

PCT Pub. Date: Apr. 24, 2003

(65) Prior Publication Data

US 2004/0045267 A1   Mar. 11, 2004

(30) Foreign Application Priority Data

Oct. 15, 2001 (JP) ............................. 2001-316913

(51) Int. Cl.
*B01D 46/00* (2006.01)
(52) U.S. Cl. ................ 55/484; 55/282.3; 55/385.3; 55/523; 55/DIG. 10; 55/DIG. 30; 60/311
(58) Field of Classification Search ............... 55/282.2, 55/282.3, 385.3, 482, 484, 523, DIG. 10, 55/DIG. 30; 60/311
See application file for complete search history.

(56) References Cited

U.S. PATENT DOCUMENTS

| 4,335,783 | A | | 6/1982 | McBrayer et al. |
| 5,207,807 | A | * | 5/1993 | Manfre et al. .................. 55/523 |
| 5,846,276 | A | * | 12/1998 | Nagai et al. ................... 55/523 |
| 6,126,833 | A | * | 10/2000 | Stobbe et al. .................. 55/523 |
| 6,328,777 | B1 | * | 12/2001 | Benthaus et al. ........... 55/385.3 |

FOREIGN PATENT DOCUMENTS

| EP | 1 142 619 A1 | * | 10/2001 |
| JP | B2 61-51240 | | 11/1986 |
| JP | 6-47620 | * | 6/1994 |
| JP | U 6-47620 | | 6/1994 |
| JP | A 8-28246 | | 1/1996 |
| JP | A 8-325070 | | 12/1996 |
| JP | A 2001-162119 | | 6/2001 |

OTHER PUBLICATIONS

Gulati, "Strength and Thermal Shock Resistance of Segmented Wall-Flow Diesel Filters", Corning Glass Works, pp 11-18.

* cited by examiner

*Primary Examiner*—Duane Smith
*Assistant Examiner*—Jason M. Greene
(74) *Attorney, Agent, or Firm*—Oliff & Berridge, PLC

(57) ABSTRACT

A honeycomb filter 1, which comprises an integral structure of a plurality of honeycomb segments 12 bonded by an adhesive 8. The honeycomb segment has numbers of through-holes 3, which are surrounded by partition walls 2 and extend in the axial direction of the segment. The honeycomb filter is characterized in that a ratio of a thermal conductivity κ s of the honeycomb segment 12 to a thermal conductivity κ a of the adhesive 8, κ s/κ a, is in a range of 5 to 300 and a density ρ a of the adhesive 8 is in a range of 0.1 to 4 g/cc. The honeycomb filter can prevent excessive temperature increase, can be low in non-uniformity of temperature distribution, and can be superior in durability.

23 Claims, 4 Drawing Sheets

HONEYCOMB FILTER

TECHNICAL FIELD

The present invention relates to a honeycomb filter used in, for example, a filter for capturing fine particles present in an exhaust gas emitted from an internal combustion engine, a boiler or the like; particularly to a honeycomb filter which can prevent excessive temperature increase, is low in non-uniformity of temperature distribution, and is superior in durability.

BACKGROUND ART

Honeycomb filters are in use in, for example, a filter for capturing fine particles present in an exhaust gas emitted from an internal combustion engine, a boiler or the like, particularly, diesel particulate.

The honeycomb filter used for such a purpose generally has, as shown in FIGS. 6(a) and 6(b), a structure having a large number of through-holes 3 extending in an X axis direction surrounded by partition walls 2, wherein each two adjacent through-holes 3 are plugged at an opposite end of the structure alternately so that each end face looks checkerboard pattern. In the honeycomb filter having such a structure, a fluid to be treated enters through-holes 3 which are not plugged at the inlet end face 42 of the structure, i.e. which are plugged at the outlet side end face 44; passes through porous partition walls 2; and is discharged from adjacent through-holes 3, i.e. those through-holes 3 plugged at the inlet side end face and not plugged at the outlet side end face 44. In this case, the partition wall 2 becomes a filter and, for example, soot emitted from a diesel engine is captured by the partition walls and deposited thereon. In the honeycomb filters used in such a manner, the sharp temperature change of exhaust gas and the local heating makes non-uniform the temperature distribution inside the honeycomb structure and there have been problems such as crack formation in honeycomb filter and the like. When the above honeycomb filter is used particularly as a filter for capturing a particulate matter present in an diesel engine, i.e. as a DPF, it is necessary to burn the carbon particles deposited on the filter to remove the particles and regenerate the filter and, in that case, high temperatures are generated locally in the filter; as a result, there have been problems such as reduction in regeneration efficiency due to non-uniformity of regeneration temperature and formation of cracks due to high thermal stress. Further, since the temperature distribution during regeneration is not uniform, it has been difficult to obtain the optimum temperature in the whole filter and achieve an improved regeneration efficiency.

Hence, there were proposed processes for producing a honeycomb filter by bonding a plurality of individual segments using an adhesive. In, for example, U.S. Pat. No. 4,335,783 is disclosed a process for producing a honeycomb filter, which comprises bonding a large number of honeycomb parts using a discontinuous adhesive. Also in JP-B-61-51240 is proposed a heat-shock resistant rotary regenerative heat exchanger which is formed by extrusion molding a matrix segment of honeycomb structure made of a ceramic material; firing them; making smooth, by processing, the outer peripheral portion of the fired segment; coating the bonding part of the resulting segment with a ceramic adhesive which turns to have substantially the same mineral composition as the matrix segment and a difference in thermal expansion coefficient of 0.1% or less at 800° C. after firing; and firing the coated segments. Also in the SAE paper 860008 of 1986 is disclosed a ceramic honeycomb structure obtained by bonding cordierite honeycomb segments with a cordierite cement. Further in JP-A-8-28246 is disclosed a ceramic honeycomb structure obtained by bonding honeycomb ceramic members with an elastic sealant made of at least a three-dimensionally intertwined inorganic fiber, an inorganic binder, an organic binder and inorganic particles. It was also tried to produce a honeycomb filter using, for example, a silicon carbide type material of high thermal conductivity and high heat resistance, in order to prevent its local heating to high temperatures and its damage due to thermal stress.

By using segment and/or a highly heat-resistant material such as silicon carbide type material, the damage caused by thermal stress can be prevented to some extent; however, it is impossible to eliminate the temperature difference between the outer peripheral portion and center of honeycomb filter, and uniform regeneration and consequent improvement in durability have been insufficient. Moreover, there have been cases of local heat generation during regeneration.

Also in JP-A-2001-162119 is disclosed a filter which is an integral ceramic filter structure produced using a sealant (adhesive) layer of 0.3 to 5 mm in thickness and 0.1 to 10 W/mk in thermal conductivity and in which the temperature of the whole part is made uniform and local unburned matter are hardly seen. By using an adhesive having a particular thickness and a particular thermal conductivity, it is possible to reduce local unburned matter and increase the efficiency of regeneration by burning soot; however, it is not sufficient in prevention of the temperature gradient during local heating to high temperature and the resulting thermal stress and has been insufficient in an increase in critical soot amount enabling regeneration by burning soot. Further, as disclosed in the above literature, by changing the thickness of the adhesive, it is possible to control the thermal conductivity and heat capacity of the adhesive; however, the increase in the thickness of the adhesive results in other inconveniences of reduction in effective area of filter and reduction in pressure loss characteristics when soot is deposited. Thus, the thermal conductivity and heat capacity and the pressure loss of filter become conflicting properties when it is intended to control them only by the thickness of the adhesive, and there is a limit in the thickness of sealant practically applicable in the filter.

DISCLOSURE OF THE INVENTION

The present invention has been made in view of such a situation and is intended to provide a honeycomb filter, which can prevent an excessive increase in temperature and can be superior in durability, even though thickness of adhesive is not modified.

The present invention provides A honeycomb filter which comprises an integral structure of a plurality of honeycomb segments bonded by an adhesive, the honeycomb segment having numbers of through-holes which are surrounded by partition walls and extend in an axial direction of the segment, characterized in that a ratio of a thermal conductivity $\kappa s$ of the honeycomb segment to a thermal conductivity $\kappa a$ of the adhesive, $\kappa s/\kappa a$, is in a range of 5 to 300 and a density $\rho a$ of the adhesive is in a range of 0.1 to 4 g/cc.

In the present invention, it is preferred that a heat capacity Ha per unit volume of the adhesive, represented by specific heat Cpa×density $\rho a$ is in a range of $0.1 \times 10^6$ to $3 \times 10^6$ $J/m^3 \cdot K$. It is also preferred that the adhesive has pores and that the adhesive contains a metal. It is further preferred in the honeycomb filter of the present invention that it comprises two or more adhesives different in either or both of thermal conductivity κ a and heat capacity Ha per unit volume and also that a thermal expansion coefficient of the adhesive is in a range of $1 \times 10^{-6}$ to $8 \times 10^{-6}$/° C. It is also preferred that the honeycomb segment comprises, as a main component, silicon carbide or a silicon-silicon carbide composite material. It is further preferred that in the honeycomb segment, given through-holes are plugged at one end face of the segment and remaining through-holes are plugged at another end face of the segment and also that 70% by volume or more of the honeycomb filter is constituted by the honeycomb segment having a sectional area of 900 to 10,000 mm$^2$.

BEST MODE FOR CARRYING OUT THE INVENTION

The honeycomb filter of the present invention is described in detail below referring to the accompanying drawings. However, the present invention is in no way restricted to the following modes for carrying out the invention. Incidentally, in the following, "section" refers to a section vertical to the direction of through-holes (X-axis direction) unless otherwise specified.

Figure 1A:
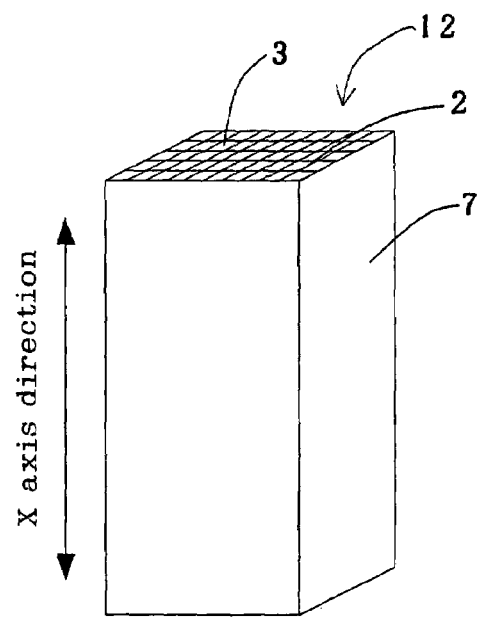
FIG. 1(a) is a schematic perspective view showing an embodiment of a honeycomb segment of the present invention.
Figure 1B:
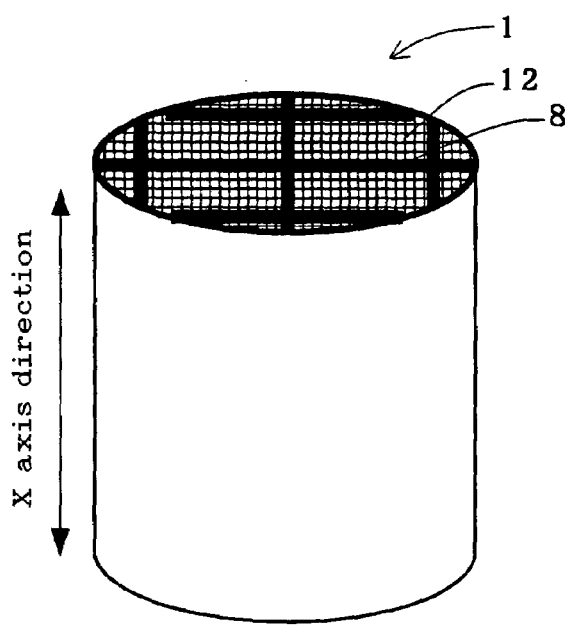
FIG. 1(b) is a schematic perspective view showing an embodiment of a filter of the present invention.
Figure 1C:
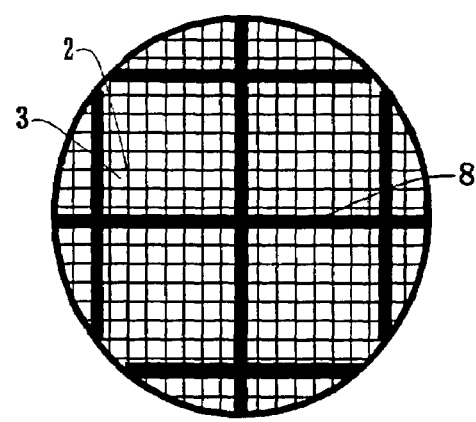
FIG. 1(c) is a schematic top view showing an embodiment of a honeycomb filter of the present invention.

As shown in, for example, FIG. 1(a), FIG. 1(b) and FIG. 1(c), the honeycomb filter 1 of the present invention is a honeycomb filter comprising an integral structure of a plurality of honeycomb segments 12 bonded by an adhesive 8, wherein the segment has numbers of through-holes 3 which are surrounded by partition walls and extend in X-axis direction 2.

An important characteristic of the present invention is that a ratio of a thermal conductivity κ s of the honeycomb segment 12 to a thermal conductivity κ a of the adhesive 8, κ s/κ a, is in a range of 5 to 300, preferably 8 to 280, more preferably 10 to 250 and a density ρ a of the adhesive 8 is in a range of 0.1 to 4 g/cc, preferably 0.3 to 3.5 g/cc, more preferably 0.5 to 3.0 g/cc. By controlling the κ s/κ a and the ρ a in such ranges, the excessive temperature increase and/or temperature gradient of the honeycomb filter can be prevented and higher durability can be obtained. In particular, the highest temperature and/or temperature gradient arising when the honeycomb filter is used as a DPF and is regenerated, can be suppressed and a honeycomb filter superior in durability can be obtained.

For example, when the honeycomb filter is used as a DPF, soot is deposited in the filter; as the soot amount increases, the amount of heat generated during regeneration becomes larger, the resultant highest temperature increases and the resultant temperature gradient becomes larger, and the resultant thermal stress becomes larger. In such a case, in order to control the temperature gradient and suppress the generation of the thermal stress, it is necessary not only to control the thermal conductivity of each honeycomb segment 12 or the adhesive 8 but also to control the ratio of the thermal conductivity κ s of the honeycomb segment 12 to the thermal conductivity κ a of the adhesive 8, i.e. κ s/κ a. When the κ s/κ a is too small, the adhesive 8 does not contribute as a heat-insulating layer; as a result, heat is conducted from one honeycomb segment into an adjacent honeycomb segment via the adhesive 8 and the temperature gradient inside the honeycomb segment tends to be large. Meanwhile, when the κ s/κ a is too large, the thermal conductivity of the adhesive 8 relative to that of the honeycomb segment 12 is too small; as a result, the temperature gradient arising in the adhesive 8 becomes too large, cracks tend to be generated in the adhesive 8, and breakage of honeycomb filter may occur.

Moreover, when the density ρ a of the adhesive 8 is too small, the adhesive 8 hardly contributes as a heat-insulating layer independently of the level of the thermal conductivity of the adhesive 8; therefore, heat is conducted from one honeycomb segment into an adjacent honeycomb segment via the adhesive 8 and the temperature gradient arising inside honeycomb segments is large. Meanwhile, when the density ρ a of the adhesive 8 is too large, the temperature gradient arising inside the adhesive 8 is too large and cracks tend to be generated in the adhesive 8. Accordingly, by controlling the κ s/κ a and the ρ a in the above ranges of the present invention, a honeycomb filter having excellent durability can be obtained.

In the present invention, the thermal conductivity κ s of the honeycomb segment 12 refers to the average thermal conductivity of the partition walls 2 and the outer wall 7 of the honeycomb segment 12 and excludes the thermal conductivity of the through-holes 3. Further, the ratio of the thermal conductivity κ s of the honeycomb segment 12 to the thermal conductivity κ a of the adhesive 8, i.e. κ s/κ a refers to a ratio of the average thermal conductivity κ s of the honeycomb segments 12 in the honeycomb filter 1 and the average thermal conductivity of the adhesive 8 in the honeycomb filter 1.

Further in the present invention, when the heat capacity Ha of the adhesive 8 per unit volume is too small, the adhesive 8 hardly contributes as a heat-insulating layer; as a result, heat is easily conducted from one honeycomb segment 12 to adjacent honeycomb segments 12 via the adhesive 8 and a temperature gradient arises easily inside honeycomb segments 12. Meanwhile, when the Ha is too large, the temperature gradient arising inside the adhesive 8 tends to be large and cracks tend to be generated in the adhesive 8. Accordingly, the heat capacity Ha of the adhesive 8 per unit volume, represented by specific heat Cpa×density ρ a is preferably in a range of $0.1 \times 10^6$ to $3 \times 10^6$ J/m$^3$·K, more preferably in a range of $0.3 \times 10^6$ to $2.5 \times 10^6$ J/m$^3$·K, most preferably in a range of $0.6 \times 10^6$ to $2.0 \times 10^6$ J/m$^3$·K.

By appropriately selecting the material and porosity of the honeycomb segment, the material of the adhesive, etc., it is possible to control the κ s/κ a and the ρ a in the respective ranges of the present invention. As a preferred specific method for controlling the κ s/κ a and the ρ a, there can be mentioned a method in which the adhesive is allowed to have predetermined pores and an intended low density. By this method, the heat capacity Ha per unit volume, the density ρ a and the thermal conductivity κ a can be lowered simultaneously. In order to allow the adhesive to have pores, there can be mentioned, for example, a method of adding, in producing the adhesive, a pore forming agent which contains certain volume of a pore already, to the raw material of the mentioned, for example, hollow particles of inorganic or organic material, such as balloon-like foamed resin, sirasu balloon and the like. When a heat-treatment step can be employed after the bonding, there is also a method of adding, as a pore forming agent, starch, cellulose or particles of inorganic or organic material, all of which burn out or melt at a given temperature and thereby form pores.

As another preferred method for controlling the κ s/κ a and the ρ a, there can be mentioned a method of allowing the adhesive to contain a metal in a form such as metal fiber, metal particles or the like. By this method, the thermal conductivity, the heat capacity and the density can be increased simultaneously. As a preferred metal, there can be mentioned copper, stainless steel or the like, and a fiber thereof or the like is particularly preferred. Further, as still another preferred method for controlling the κ s/κ a and the ρ a, there can be mentioned a method of allowing the adhesive to contain a material of high specific gravity, for example, zirconium silicate, zirconia or the like. By this method, it is possible to increase only the heat capacity and lower the thermal conductivity.

It is also possible to vary the κ s and thereby allow the κ s/κ a to fall in an appropriate range, by varying the composition, particle diameters, etc. of a raw material used in production of honeycomb segment. For example, by using a pore forming agent as a raw material of honeycomb segment, a segment of large pores and low thermal conductivity can be obtained. When metallic silicon and silicon carbide are used as a constituent material of honeycomb segment, a segment of high thermal conductivity can be obtained by making high the content of the metallic silicon.

By appropriately selecting or combining these methods, the honeycomb segment of the present invention can be produced favorably.

It is also preferred that the honeycomb filter of the present invention contains two or more kinds of adhesives different in either or both of thermal conductivity κ a and heat capacity Ha per unit volume. When the present honeycomb filter is used as a DPF, for example, the amount of heat generated is large particularly at the center part. Therefore, by using, as shown in, for example, FIG. 2, an adhesive 8A of low thermal conductivity and small heat capacity per unit volume, at the center part and an adhesive 8B of high thermal conductivity κ a and large heat capacity Ha, at the outer periphery part, the temperature increase at the center part is prevented and the temperature distribution in the honeycomb filter becomes more uniform. Thus, by bonding segments using different adhesives depending upon the requirements inside the filter, to control the temperature gradient in the filter, the durability of the honeycomb filter can be enhanced more. There is no particular restriction as to the combination of adhesives, and a plurality of adhesives different in κ a and/or Ha can be used in combination depending upon the structure, use conditions, etc. of the honeycomb filter so that the temperature distribution of the whole honeycomb filter becomes uniform. Adhesives different in κ a and/or Ha can be produced by the above-mentioned methods using a pore forming agent, a metal, a material of high specific gravity or the like.

As the adhesive for the honeycomb filter of the present invention, one having a relatively small thermal expansion coefficient is preferred because a large thermal expansion coefficient tends to give cracks by a thermal shock or the like. The thermal expansion coefficient of the adhesive at 20 to 800° C. is preferably $1 \times 10^{-6}$ to $8 \times 10^{-6}/°$ C., more preferably $1.5 \times 10^{-6}$ to $7 \times 10^{-6}/°$ C., most preferably $2 \times 10^{-6}$ to $6 \times 10^{-6}/°$ C. Too large a difference in thermal expansion coefficient between adhesive and honeycomb segment is not preferred because a thermal stress is concentrated at their bonding area when they are heated or cooled. The difference in thermal expansion coefficient between adhesive and honeycomb segment from 20° C. to 800° C. is preferably $1 \times 10^{-6}/°$ C. or less. As the adhesive, one containing a ceramic as the main component is preferably used ordinarily. As the raw materials for producing the adhesive, there are used, for example, a mixtures of particles or fiber of aluminum silicate, aluminum phosphate or the like and a colloidal sol such as colloidal silica, colloidal alumina or the like; and, as mentioned above, a metal such as metal fiber or the like, a pore forming agent, ceramic particles, etc. depending upon the required property.

In the present invention, the main component of the honeycomb segment is preferably least one kind of material selected from the group consisting of cordierite, mullite, alumina, spinel, silicon carbide, silicon carbide-cordierite type composite material, silicon-silicon carbide type composite material, silicon nitride, lithium aluminum silicate, aluminum titanate, Fe—Cr—Al type metal and a combination thereof, from the standpoints of strength, heat resistance, etc. Silicon carbide or a silicon-silicon carbide composite material is particularly suitable from the standpoints of thermal conductivity and heat resistance. Here, "main component" refers to that it constitutes 50% by mass or more, preferably 70% by mass or more, further preferably 80% by mass or more of the honeycomb segment. In the present invention, when the honeycomb segment contains, as the main component, a composite material of metallic silicon (Si) and silicon carbide (SiC); in case the Si content of honeycomb segment specified by Si/(Si+SiC) is too low, the effect of Si addition is hardly obtained; in case the Si content exceeds 50% by mass, the effect of heat resistance and high thermal conductivity characteristic of SiC is hardly obtained. Therefore, the Si content is preferably 5 to 50% by mass, more preferably 10 to 40% by mass.

In the present invention a partition wall of the honeycomb segment is preferably a porous material serving as a filter. There is no particular restriction as to the thickness of the partition wall. However, too large a thickness gives too large a pressure loss when a fluid to be treated passes through the porous partition wall; too small a thickness results in an insufficient filter strength; therefore, such thicknesses are not preferred. The thickness of the partition wall is preferably 30 to 2,000 μm, more preferably 40 to 1,000 μm, most preferably 50 to 500 μm.

In the present invention, there is no particular restriction as to the cell density (the number of through-holes per unit sectional area) of the honeycomb segment. However, too small a cell density results in a filter of insufficient strength and insufficient effective GSA (geometrical surface area); too large a cell density results in a large pressure loss when a fluid to be treated passes. The cell density is in a range of preferably 6 to 2,000 cells/in.$^2$ (0.9 to 311 cells/cm$^2$), more preferably 50 to 1,000 cells/in.$^2$ (7.8 to 155 cells/cm$^2$), most preferably 100 to 400 cells/in.$^2$ (15.5 to 62.0 cells/cm$^2$).

There is no particular restriction as to the sectional shape of through-holes (cell shape). However, it is preferred to be any of triangle, tetragon, hexagon and corrugate from the standpoint of production.

In the present invention, there is no restriction as to the size of the honeycomb segment. However, too large a size gives rise to a problem of breakage due to thermal stress; too small a size makes troublesome the production of individual segments and their integration by bonding; therefore, such sizes are not preferred. As the honeycomb segment size, the sectional area of honeycomb segment is preferably 900 to 10,000 mm², more preferably 900 to 5,000 mm², most preferably 900 to 3,600 mm², and 70% by volume or more of the honeycomb filter is preferably constituted by honeycomb segments of such a size. There is no particular restriction as to the shape of the honeycomb segment. However, the basic shape can be tetragonal in sectional shape, that is, a quadrangular prism as shown in, for example, FIG. 1(a); and the shape of outer peripheral honeycomb segments can be appropriately selected so as to fit the shape of the honeycomb filter after integration, as shown in FIG. 1(b) and FIG. 1(c).

Figure 2:
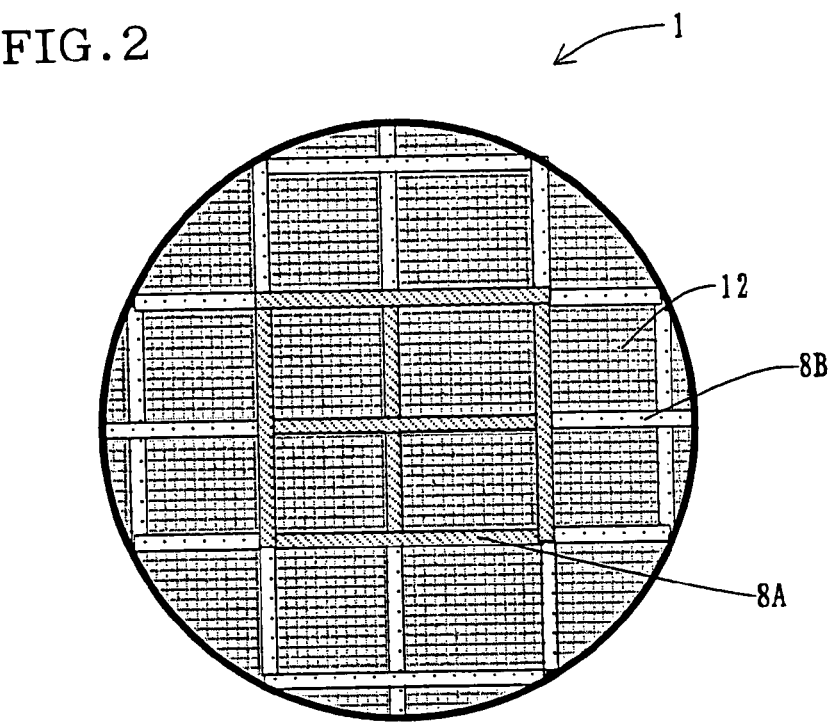
FIG. 2 is a schematic top view showing another embodiment of a honeycomb filter of the present invention.

There is no particular restriction as to the sectional shape of the honeycomb filter of the present invention, and the sectional shape can be circular as shown in, for example, FIG. 2, oval, a race truck shape, elliptic, polygonal (e.g. triangular, substantially triangular, tetragonal or substantially tetragonal), or an irregular shape. There is no particular restriction, either, as to the thermal conductivity of the whole honeycomb filter. However, too high a thermal conductivity is not preferred because even in the honeycomb filter of the present invention, the amount of the heat released is too large, there is no sufficient temperature increase during regeneration, and the efficiency of regeneration is low. Too low a thermal conductivity is not preferred, either, because the amount of the heat released is too small, resulting in too large a temperature increase. The thermal conductivity at 40° C. is preferably 10 to 60 W/mK, more preferably 15 to 55 W/mK, most preferably 20 to 50 W/mK.

Figure 3:
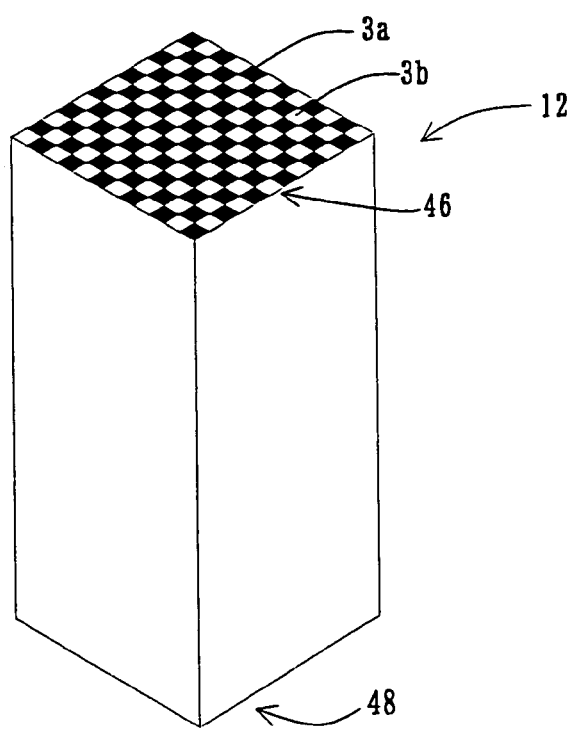
FIG. 3 is a schematic perspective view showing another embodiment of a honeycomb segment of the present invention.

When the honeycomb segment 12 of the present invention is used particularly as a DPF, it is preferred that, as shown in FIG. 3, openings of given through-holes 3a are plugged at one end face 46 of the segment and openings of remaining through-holes 3b are plugged at other end face 48 of the segment. It is particularly preferred that, as shown in FIG. 3, each two adjacent through-holes 3 are plugged at an opposite end of the structure alternately so that the both end faces 46 and 48 look checkerboard pattern. By such plugging, a fluid to be treated entering from, for example, one end face 46 passes through partition walls 2 and leaves from other end face 48; the partition walls 2 serve as a filter when the fluid to be treated passes therethrough; thereby, an intended substance can be removed.

As the material used for plugging, there can be suitably used at least one kind of material selected from the above-mentioned ceramics and metals suitably used for the honeycomb segment.

It is preferred that the honeycomb filter of the present invention is loaded with a catalyst, for example, a metal having a catalytic activity, when the present honeycomb filter is intended to be used as a catalyst carrier for purification of an exhaust gas emitted from a heat engine such as internal combustion engine or the like or from a burner such as boiler or the like, or for reforming of liquid fuel or gaseous fuel. As a representative metal having a catalytic activity, Pt, Pd, Rh are mentioned, and it is preferred to load at least one kind of these on the honeycomb filter.

Next, description is made on a process for producing the honeycomb filter of the present invention.

The above-mentioned preferred material, for example, a silicon carbide powder is used as a raw material powder for the honeycomb filter. Thereto is added a binder, for example, methyl cellulose and hydroxypropoxyl methyl cellulose. Further, a surfactant and water are added to prepare a plastic puddle. This puddle is subjected to extrusion molding to obtain a honeycomb segment having an intended shape.

The honeycomb segment is dried using, for example, a microwave and a hot air. Each two adjacent through-holes 3 of the honeycomb segment are plugged at opposite end of the segment alternately with the same material as used in production of the honeycomb filter so that the both end faces of the honeycomb segment look checkerboard pattern. The resulting segment is dried, then heat-degreased in, for example, a $N_2$ atmosphere, and fired in an inert atmosphere such as Ar or the like to obtain a honeycomb segment having a desired thermal conductivity κ s. The segments are bonded using an adhesive raw material, for example, a ceramic cement containing a pore forming agent, a metal (e.g. a metal fiber), a high specific gravity material, etc.; the bonded segments are dried and hardened at 200° C.; thereby, a honeycomb filter can be obtained.

Catalyst loading on the thus-produced honeycomb filter can be conducted by a method ordinarily used by those skilled in the art. It can be conducted, for example, by wash-coating a catalyst slurry on the honeycomb filter, and then conducting drying and firing. Incidentally it is possible to load a catalyst on the honeycomb segment, followed by bonding, to obtain a honeycomb filter, or produce a honeycomb filter, followed by loading a catalyst thereon.

The present invention is described in more detail below by way of Examples. However, the present invention is in no way restricted to these Examples.

EXAMPLES AND COMPARATIVE EXAMPLES (Production of Honeycomb Segments)

There were mixed, as raw materials, a SiC powder and a metallic Si powder, and a polymethyl methacrylate as a pore forming agent, in mass proportions shown in Table 1. Thereto were added methyl cellulose, hydroxypropoxyl methyl cellulose, a surfactant and water to prepare a plastic puddle. This puddle was subjected to extrusion molding, the extrudate was dried using a microwave and hot air to obtain a honeycomb segment having a partition wall thickness of 380 μm, a cell density of 31.0 cells/cm² (200 cells/in.²) a square section of 35 mm×35 mm and a length of 152 mm. Each two adjacent through-holes of the honeycomb segment were plugged at an opposite end of the segment alternately with the same materials as used in production of the honeycomb filter so that the two end faces look checkerboard pattern. The plugged honeycomb segment was dried, then degreased in the air at about 400° C., and fired in an Ar inert atmosphere at about 1,450° C. to obtain Si-bonded SiC honeycomb filter segments A or B.

The honeycomb segments A and B were measured for porosity, four-point bending strength, Young modulus and thermal conductivity. The results are shown in Table 1. Porosity was measured by the Archimedes method. Thermal conductivity was measured by a laser flash method according to a method described in JIS R 1611. Four-point bending strength was measured by a method according to JIS R 1601.

TABLE 1

| Honeycomb segment | Average particle diameter of SiC powder ($\mu$m) | Amount of SiC powder used (mass parts) | Average particle diameter of metallic Si ($\mu$m) | Amount of metallic Si used (mass parts) | Average diameter of pore forming agent ($\mu$m) | Amount of pore forming agent used (mass parts) | Average pore diameter ($\mu$m) | Porosity (%) | 4-Point bending strength (MPa) | Young' modulus (GPa) | Thermal conductivity (W/mK) |
|---|---|---|---|---|---|---|---|---|---|---|---|
| A | 50   | 70 | 4 | 30 | —  | —  | 15 | 40 | 35 | 25 | 40 |
| B | 32.6 | 80 | 4 | 20 | 12 | 20 | 10 | 55 | 12 | 10 | 12 |

(Preparation of Adhesive Raw Materials)

There were mixed, in a composition shown in Table 2, an aluminosilicate fiber having an average diameter of 100 $\mu$m, a silicon carbide powder having an average particle diameter of 100 $\mu$m, zirconium silicate, a 40 mass % aqueous colloidal silica solution as an inorganic binder and a clay. Thereto was added water, followed by kneading for 30 minutes using a mixer, to prepare adhesive raw materials 1 to 5. In the adhesive raw materials 2 and 3, a foamed resin was added as a pore forming agent; in the adhesive raw material 4, a Cu fiber of 1 mm in length was added as a metal fiber. Zirconium silicate was used in place of silicon carbide to prepare an adhesive raw material 6, and zirconium silicate and colloidal silica were used in place of an aluminosilicate fiber and silicon carbide to prepare an adhesive raw material 7. The adhesive raw materials 1 to 7 were dried and hardened to produce adhesives 1 to 7. The adhesives 1 to 7 were measured for thermal conductivity, density and heat capacity. The results are shown in Table 3. Thermal conductivity was measured by a laser flash method according to a method described in JIS R 1611. Heat capacity was determined by measuring a specific heat capacity by a laser flash method according to a method described in JIS R 1611, measuring density by the Archimedes method, calculating a product of the two measurements, and taking the product as heat capacity.

TABLE 2

| Adhesive raw material | Aluminosilicate fiber (mass %) | Silicon carbide (mass %) | Zirconium silicate (mass %) | Colloidal silica (mass %) | Clay (mass %) | Water (mass %) | Cu fiber (mass %) | Foamed resin (mass %) |
|---|---|---|---|---|---|---|---|---|
| 1 | 32 | 37 | —  | 20 | 1 | 10 | —  | —  |
| 2 | 28 | 27 | —  | 27 | 1 | 9  | —  | 8  |
| 3 | 24 | 24 | —  | 24 | 1 | 8  | —  | 19 |
| 4 | 27 | 33 | —  | 16 | 1 | 8  | 15 | —  |
| 5 | —  | 69 | —  | 27 | 1 | 3  | —  | —  |
| 6 | 27 | —  | 46 | 18 | 1 | 8  | —  | —  |
| 7 | —  | —  | 50 | 29 | 1 | 20 | —  | —  |

TABLE 3

| Adhesive | Thermal conductivity (W/mK) | Density (g/cc) | Thermal expansion coefficient ($\times 10^{-6}$/° C.) | Heat capacity (Ha) $\times 10^{-6}$ (J/m$^3$ · K) |
|---|---|---|---|---|
| 1 | 0.9  | 1.7 | 3.2 | 1.3 |
| 2 | 0.2  | 1   | 2.8 | 0.8 |
| 3 | 0.05 | 0.6 | 2.5 | 0.5 |
| 4 | 2    | 2   | 3.8 | 1.8 |
| 5 | 3.5  | 1.9 | 3.6 | 1.3 |
| 6 | 0.3  | 1.3 | 3.5 | 1.4 |
| 7 | 0.1  | 4.3 | 3.3 | 3.1 |

Examples 1 to 5 and Comparative Examples 1 to 3

Figure 4:
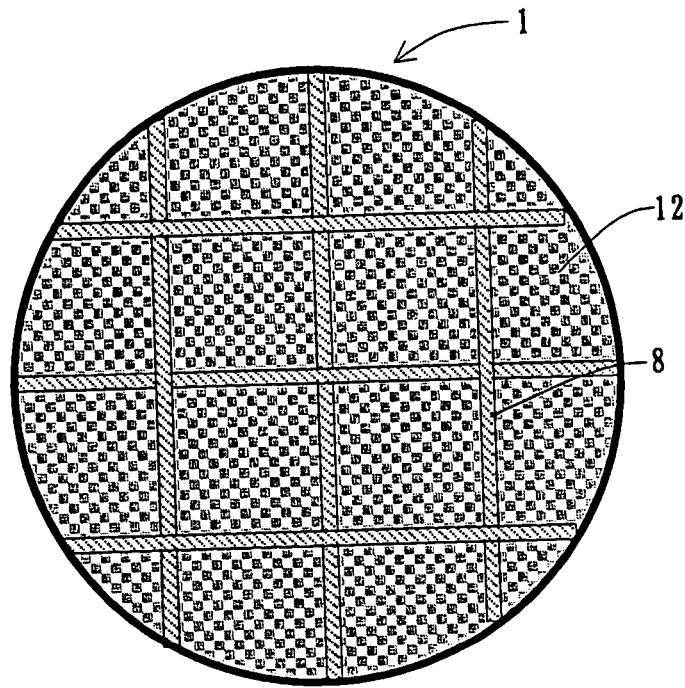
FIG. 4 is a perspective top view showing the honeycomb filters of the present invention produced in Examples 1 to 5.

Using the honeycomb segments A and B and the adhesive raw materials 1 to 7, all obtained in the above operations, bonding of honeycomb segments was conducted in a combination shown in Table 4. Then, drying and hardening at 200° C. and subsequent cutting were conducted to obtain columnar honeycomb filters of FIG. 4 for DPF, each of 144 mm in diameter and 152 mm in length. Each honeycomb filter was installed to an exhaust line of a 3-liter direct injection diesel engine, and the engine was operated using a diesel oil containing 30 ppm of a Ce fuel additive produced by Rhodia and soot of a specified amount was accumulated on the filter. Subsequently, the honeycomb filter was heated to 600° C. using a propane gas burner and the oxygen content inside the honeycomb filter was changed to 18% by switching of a bypass valve to and regenerate the honeycomb filter by burning the soot. The amount of soot accumulated was gradually increased each by 2 g/liter starting from 4 g/liter, and the amount of soot captured and accumulated at a timing when cracks were detected at the end face of the filter by microscope observation, was taken as critical soot amount. The results are shown in Table 4. As shown in Table 4, each of the honeycomb filters obtained in Examples 1 to 5 shows a κ s/κ a and a Ha both of the present invention and, as compared with the honeycomb filters obtained in Comparative Examples 1 to 3, each showing a κ s/κ a and a Ha, not falling in the present invention, gave a large critical soot amount, indicating that the honeycomb filters of Examples 1 to 5 are clearly superior in durability to those of Comparative Examples 1 to 3.

TABLE 4

|  | Honeycomb segment | Adhesive | Ks/Ka | Ha × 10$^{-6}$ (J/m$^3$K) | Critical soot amount deposited (g/liter) | Appearance of sample |
| --- | --- | --- | --- | --- | --- | --- |
| Example 1 | A | 1 | 44 | 0.9 | 10 | Microcracks |
| Example 2 | A | 2 | 200 | 0.2 | 12 | Microcracks |
| Example 3 | A | 5 | 11 | 1.9 | 12 | Microcracks |
| Example 4 | B | 3 | 240 | 0.6 | 12 | Microcracks |
| Example 5 | B | 4 | 6 | 1.8 | 10 | Microcracks |
| Comparative Example 1 | A | 3 | 800 | 0.5 | 6 | Cracks inside adhesive |
| Comparative Example 2 | B | 5 | 4.3 | 1.3 | 6 | Cracks of 45° direction |
| Comparative Example 3 | A | 7 | 400 | 3.1 | 4 | Cracks inside adhesive |

Examples 6 and 7

Figure 5:
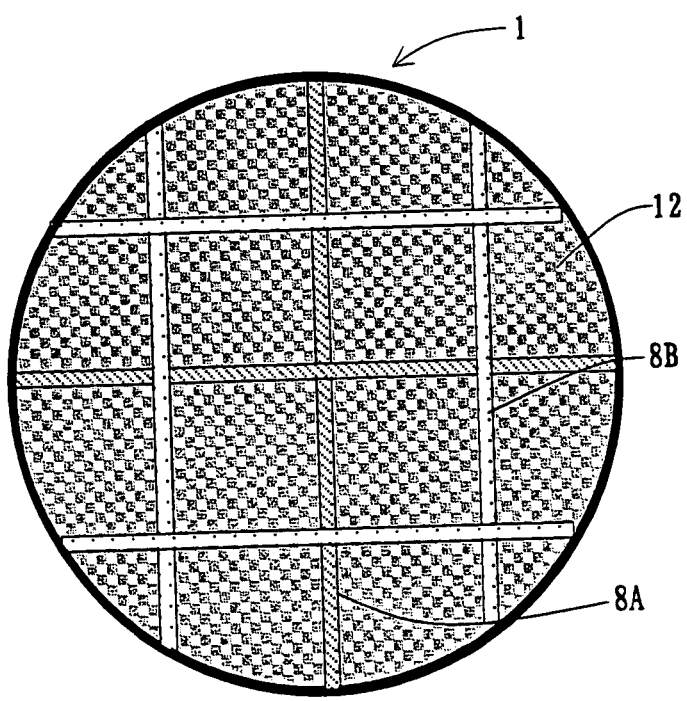
FIG. 5 is a perspective top view showing the honeycomb filters of the present invention produced in Examples 6 and 7.
Figures 6A, 6B:
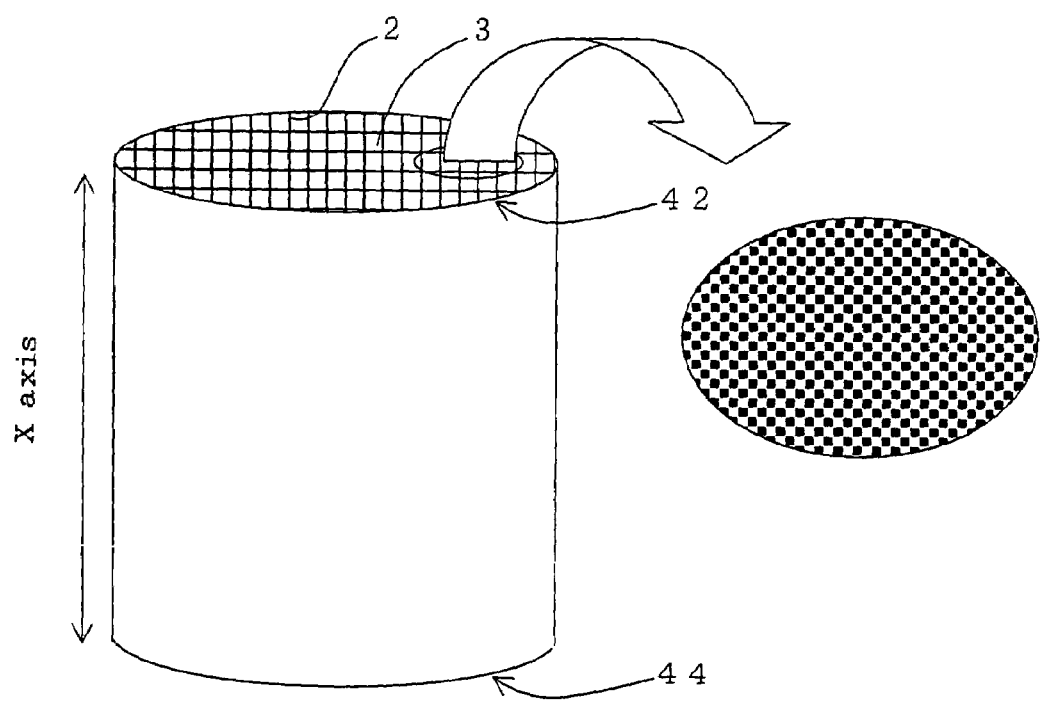
FIG. 6(a) is a schematic perspective view showing a conventional honeycomb filter.
FIG. 6(b) is a partially enlarged top view of FIG. 6(a)

Honeycomb filters were produced in the same manner as in Example 1 except that, as shown in FIG. 5, an adhesive 8A (a cross shaped adhesive portion passing the center of honeycomb filter) and an adhesive 8B (a peripheral adhesive portion) were combined as shown in Table 3. They were measured for critical soot amount deposited in the same manner as in Example 1. As a result, as shown in Table 5, temperature distribution became smaller by using, at the peripheral adhesive portion, an adhesive small in thermal conductivity and heat capacity; as compared with Examples 1 and 3 using only one kind of adhesive, critical soot amount increased by one rank and moreover there was an increase in durability.

TABLE 5

|  | substrate | Adhesive 8A (+-shaped portion) | Adhesive 8B (peripheral portion) | Ks/Ka (8A) | Ks/Ka (8B) | Critical soot amount deposited (g/liter) |
| --- | --- | --- | --- | --- | --- | --- |
| Example 6 | A | 1 | 2 | 44 | 200 | 14 |
| Example 7 | A | 5 | 2 | 11 | 200 | 14 |

INDUSTRIAL APPLICABILITY

As described above, in the honeycomb filter of the present invention, the ratio of the thermal conductivity κ s of the honeycomb segment to the thermal conductivity κ a of the adhesive, κ s/κ a, is in a range of 5 to 300 and the density ρ a of the adhesive is in a range of 0.1 to 4 g/cc; therefore, the present honeycomb filter showed good durability. The honeycomb filter of the present invention is used suitably particularly in DPF; however, since an effect of the present invention lie in prevention of excessive temperature increase of filter and uniformization of temperature distribution inside filter, the applications of the present filter are not limited to DPF alone.

What is claimed is:

1. A honeycomb filter which comprises an integral structure of a plurality of honeycomb segments bonded by an adhesive, the honeycomb segment having numbers of through-holes which are surrounded by partition walls and extend in an axial direction of the segment,
wherein a ratio of a thermal conductivity κ s of the honeycomb segment to a thermal conductivity κ a of the adhesive, κ s/κ a, is in a range of 5 to 300, a density ρ a of the adhesive is in a range of 0.1 to 4 g/cc and a heat capacity Ha per unit volume of the adhesive, represented by specific heat Cpa×density ρ a is in a range of 0.1×10$^6$ to 3×10$^6$ J/m$^3$·K.

2. A honeycomb filter according to claim 1, wherein the adhesive has pores.

3. A honeycomb filter according to claim 2, wherein the adhesive contains a metal.

4. A honeycomb filter which comprises an integral structure of a plurality of honeycomb segments bonded by an adhesive, the honeycomb segment having numbers of through-holes which are surrounded by partition walls and extend in an axial direction of the segment,
wherein a ratio of a thermal conductivity κ s of the honeycomb segment to a thermal conductivity κ a of the adhesive, κ s/κ a, is in a range of 5 to 300 and a density ρ a of the adhesive is in a range of 0.1 to 4 g/cc, and
wherein the honeycomb filter comprises two or more adhesives different in either or both of thermal conductivity κ a and heat capacity Ha per unit volume.

5. A honeycomb filter according to claim 3, comprising two or more adhesives different in either or both of thermal conductivity κ a and heat capacity Ha per unit volume.

6. A honeycomb filter which comprises an integral structure of a plurality of honeycomb segments bonded by an adhesive, the honeycomb segment having numbers of through-holes which are surrounded by partition walls and extend in an axial direction of the segment,
wherein a ratio of a thermal conductivity κ s of the honeycomb segment to a thermal conductivity κ a of the adhesive, κ s/κ a, is in a range of 5 to 300, a density ρ a of the adhesive is in a range of 0.1 to 4 g/cc and a thermal expansion coefficient of the adhesive is in a range of 1×10$^{-6}$ to 8×10$^{-6}$° C.

7. A honeycomb filter according to claim 5, wherein a thermal expansion coefficient of the adhesive is in a range of $1 \times 10^{-6}$ to $8 \times 10^{-6}$° C.

8. A honeycomb filter according to claim 1, wherein the honeycomb segment comprises, as a main component, silicon carbide or a silicon-silicon carbide composite material.

9. A honeycomb filter according to claim 7, wherein the honeycomb segment comprises, as a main component, silicon carbide or a silicon-silicon carbide composite material.

10. A honeycomb filter according to claim 1, wherein in the honeycomb segment, given through-holes are plugged at one end face of the segment and remaining through-holes are plugged at another end face of the segment.

11. A honeycomb filter according to claim 9, wherein in the honeycomb segment, given through-holes are plugged at one end face of the segment and remaining through-holes are plugged at another end face of the segment.

12. A honeycomb filter according to claim 1, wherein 70% by volume or more of the honeycomb filter is constituted by the honeycomb segment having a sectional area of 900 to 10,000 mm$^2$.

13. A honeycomb filter according to claim 11, wherein 70% by volume or more of the honeycomb filter is constituted by the honeycomb segment having a sectional area of 900 to 10,000mm$^2$.

14. A honeycomb filter according to claim 4, wherein the adhesive has pores.

15. A honeycomb filter according to claim 4, wherein the adhesive contains a metal.

16. A honeycomb filter according to claim 4, wherein the honeycomb segment comprises, as a main component, silicon carbide or a silicon-silicon carbide composite material.

17. A honeycomb filter according to claim 4, wherein in the honeycomb segment, given through-holes are plugged at one end face of the segment and remaining through-holes are plugged at another end face of the segment.

18. A honeycomb filter according to claim 4, wherein 70% by volume or more of the honeycomb filter is constituted by the honeycomb segment having a sectional area of 900 to 10,000 mm$^2$.

19. A honeycomb filter according to claim 6, wherein the adhesive has pores.

20. A honeycomb filter according to claim 6, wherein the adhesive contains a metal.

21. A honeycomb filter according to claim 6, wherein the honeycomb segment comprises, as a main component, silicon carbide or a silicon-silicon carbide composite material.

22. A honeycomb filter according to claim 6, wherein in the honeycomb segment, given through-holes are plugged at one end face of the segment and remaining through-holes are plugged at another end face of the segment.

23. A honeycomb filter according to claim 6, wherein 70% by volume or more of the honeycomb filter is constituted by the honeycomb segment having a sectional area of 900 to 10,000 mm$^2$.

* * * * *